United States Patent [19]

Fronczkowski et al.

[11] 4,127,677

[45] Nov. 28, 1978

[54] XYLITOL-COATED CHEWING GUM AND METHOD

[75] Inventors: Paul R. Fronczkowski, Oakland, N.J.; Dominick R. Friello, Danbury, Conn.

[73] Assignee: Life Savers, Inc., New York, N.Y.

[21] Appl. No.: 859,783

[22] Filed: Dec. 12, 1977

[51] Int. Cl.² .............................................. A23G 3/30
[52] U.S. Cl. .................................. 426/5; 426/103; 426/548; 426/804
[58] Field of Search ....................... 426/3–6, 426/548, 804, 103

[56] References Cited

U.S. PATENT DOCUMENTS

| | | | |
|---|---|---|---|
| 2,304,246 | 12/1942 | Ekert | 426/5 |
| 2,460,698 | 2/1949 | Lindhe | 426/5 |
| 3,208,405 | 9/1965 | Beer | 426/3 |
| 3,554,767 | 1/1971 | Daum et al. | 426/6 |
| 3,899,593 | 8/1975 | Hammond et al. | 426/3 |
| 3,914,434 | 10/1975 | Bohni | 426/548 |
| 4,065,578 | 12/1977 | Reggio et al. | 426/548 |

*Primary Examiner*—Jeanette M. Hunter
*Attorney, Agent, or Firm*—Lawrence S. Levinson; Merle J. Smith; Burton Rodney

[57] ABSTRACT

A xylitol-coated chewing gum is provided which delivers an intense instantaneous cooling effect. The xylitol coating has a pleasant smooth feel and which coating is applied via a coating syrup containing from about 55 to 70% solids of which from about 95 to about 99.5% is xylitol.

8 Claims, No Drawings

XYLITOL-COATED CHEWING GUM AND METHOD

FIELD OF THE INVENTION

The present invention relates to xylitol-coated chewing gum having a smooth coating relatively free of imperfections which contains from about 95 to about 99.5% xylitol, and to a method for preparing the same.

BACKGROUND OF THE INVENTION

The use of xylitol in chewing gum is disclosed in U.S. Pat. No. 3,899,593 to Hammond et al. Xylitol is employed in amounts ranging from 50 to 80% together with glycerol and flavor agents. The resulting chewing gum is said to present a pleasant cooling effect in the mouth.

U.S. Pat. No. 3,914,434 to Bohni discloses non-cariogenic compositions, including chewing gum, containing xylitol in place of sugar.

Unfortunately, where it has been attempted to prepare xylitol-coated chewing gum, it has been found that the coating produced on the chewing gum is generally of low quality, having a grayish off-white color. These coatings of inferior structure and color are formed employing a xylitol-coating composition containing 40 to 45% solids.

DETAILED DESCRIPTION OF THE INVENTION

In accordance with the present invention, it has been found that the coating problems associated with the preparation of prior art xylitol-coated chewing gums can be overcome by employing a xylitol-coating solution containing from about 55 to about 70% solids of which from about 95 to about 99.5% is xylitol. Use of such a xylitol-coating solution has been found to reduce coating times to enable formation of a smooth practically flawless coating having a bright white or other color.

The chewing gum of the present invention delivers an intense instantaneous cooling effect and is comprised of a xylitol-coated gum core or center, the gum core including gum base, one or more sweeteners, plasticizer (bulking agent), one or more flavors, and other conventional chewing gum ingredients such as softeners, texturizing agents, emulsifiers, fillers, anti-oxidants, colorants and the like. The gum core or center may be prepared employing conventional chewing gum manufacturing techniques.

The xylitol coating on the gum core contains from about 95 to about 99.5% xylitol, from about 0.1 to about 1.5% colorant, and from about 0.1 to about 1.5% binder and/or suspending agent, and optionally one or more flavors, other colorants, sweeteners and the like.

The xylitol-coating material is applied to the gum cores or centers from a coating syrup containing from about 30 to about 45% by weight water and from about 55 to about 70% solids, of which from about 95 to about 99.5% is xylitol, from about 0.5 to about 1.5% is colorant such as titanium dioxide or other conventional colorant, and from about 0.5 to about 1.5% is binder and/or suspending agent such as gum arabic, xanthan gum, gum tragacanth, tapioca dextrin, modified food starch and the like. The latter keeps the xylitol in suspension and aids in binding the xylitol coating to the gum core or center.

In forming the coating syrup, the above ingredients are mixed in cold water, the mixture is heated to form a solution and the solution is cooled down to 140° to 170° F. before coating. At this point, flavoring and/or colorant may be added to the solution.

In carrying out the coating operation, the gum cores or centers are fed to a standard revolving coating pan, and the xylitol-coating syrup is spray coated on to the gum cores. After drying, the coated gum pieces are polished employing conventional means to produce a xylitol-coated chewing gum product having a remarkably smooth coating (for the large amount of xylitol present) which is substantially free from imperfections.

Flavoring may be added to the gum base and other ingredients forming the gum center and/or may be added to the xyltiol coating solution. The flavoring in the gum center will be present in an amount within the range of from about 0.5 to about 1.5%, and preferably from about 0.7 to about 1.2% by weight of the gum center. The flavoring in the coating will be present in an amount within the range of from about 0.5 to about 5%, and preferably from about 1.25 to about 4% by weight of the coating. Such flavoring may comprise oils derived from plants, leaves, flowers, fruit, etc. Representative flavor oils of this type include citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum of the invention with or without conventional preservatives.

Sweeteners suitable for use herein which may be present in the gum center and/or coating may comprise natural sugar, and/or natural or synthetic sugar substitutes.

Where employed, the synthetic sweeteners may be present in the chewing gum in an amount wihtin the range of from about 0.04 to about 2% and preferably from about 0.4 to about 0.8% by weight of the chewing gum. Examples of synthetic sweeteners suitable for use herein include free saccharin acid, sodium, calcium or ammonium saccharin, cyclamate salts, dihydrochalcones, glycyrrhizic acid and salts, L-aspartyl-L-phenylalanine methyl ester and mixtures thereof.

Where employed, natural sugars and/or natural sugar substitutes may be present in an amount within the range of from about 0.05 to about 90%, and preferably from about 10 to about 85% by weight of the chewing gum. Such natural sweeteners suitable for use herein include sugar alcohols, such as, sorbitol, xylitol, mannitol, or maltitol, as well as monosaccharides of 5 or 6 carbon atoms, such as arabinose, xylose, ribose, glucose, mannose, galactose, fructose, dextrose, or sorbose or mixtures of two or more of the foregoing monosaccharides, disaccharides, such as sucrose, cane or beet sugar, lactose, maltose or cellobiose; and polysaccharides, such as, partially hydrolyzed starch, dextrin or corn syrup solids.

The gum base will be present in an amount within the range of from about 10 to about 60%, and preferably from about 15 to about 45% by weight.

In general, the gum base is prepared by heating and blending various ingredients, such as natural gums, synthetic resins, waxes, plasticizers, etc., in a manner well known in the art. Typical examples of the ingredients found in a chewing gum base are masticatory substances of synthetic origin such as styrene-butadiene copolymer, isobutyleneisoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 5 to about 15%, preferably from about 8 to about 12%, and optimally from about 9 to about 11% by weight of the gum base composition.

The gum base may also include solvents, detackifiers, waxes, softening agents, lubricants, fillers, emulsifiers, colorants, antioxidants, and/or texturizers, bulking agents and other conventional ingredients as will be apparent to those skilled in the art. Examples of typical gum bases suitable for use herein are disclosed in U.S. Pat. Nos. 3,052,552 and 2,197,719. Typical ingredients included in gum base compositions are the following:

| Base I | Parts by Weight |
| --- | --- |
| Ester gum | 58 |
| Chalk | 30 |
| Rubber latex solids | 10 |
| Lecithin | 2 |
| Base II | |
| Ester gum | 88 |
| Rubber latex solids | 10 |
| Lecithin | 2 |
| Base III | |
| Chicle | 20 |
| Jelutong | 40 |
| Gutta soh | 8.5 |
| Lecithin | 2 |
| Chalk | 2 |
| Base IV | |
| Partially oxidized chicle | 68 |
| Lecithin | 2 |
| Chalk | 30 |
| Base V | |
| Jelutong (dry) | 60 |
| Gutta siak | 13 |
| Lecithin | 2 |
| Chalk | 25 |

The following Examples represent preferred embodiments of the invention.

EXAMPLES 1 TO 12

Xylitol-coated chewing gums having center or core compositions as shown in Table I are prepared as described below.

Gum base is melted and maintained at a temperature within the range of 150°–175° F. Softener is added and then the solid sugar alcohols are added slowly with stirring. Thereafter, liquid flavor is added and the mixture is stirred until homogeneous. Sugar alcohols are slowly added and then artificial and/or natural sweetener (where employed).

Where spray dried flavors are employed, they are added with the artificial sweeteners.

The above mixture is stirred until homogeneous, cooled, rolled and scored and individual pieces or pillows are produced.

The xylitol-coating solution shown in Table II below is formed by dissolving gum arabic (or other binder) in cold water, with agitation. Titanium dioxide (alone and/or other colorant) and xylitol are added with agitation. The mixture is heated to about 200° F., and cooled to 150°–160° F. before coating. Flavor and/or other colorant may be added at this point.

The gum centers to be coated are placed in a standard revolving coating pan. The gum pieces are dedusted using cool dry air and the xylitol-coating solution (150°–160° F.) containing 62% solids, is sprayed thereon until the desired weight or gauge is reached. The coated gum pieces are jogged or tray dried and then polished, by conventional means.

TABLE I

Composition of Gum Center or Core
Parts by Weight

| Example No. | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| Gum Base | 30.0 | 26.0 | 26.0 | 30.0 | 26.0 | 25.0 | 00.0 | 35.0 | 30.0 | 26.0 | 22.0 | 21.0 |
| Sorbitol (Crystalline) | 50.4 | 40.4 | 43.0 | 29.4 | 34.0 | 12.9 | 45.0 | 30.6 | 36.5 | 40.7 | | |
| Sorbitol Solution (70%) | 17.0 | 21.09 | — | 22.0 | 20.5 | 10.0 | 22.9 | 22.1 | 22.2 | 12.6 | | |
| Mannitol | — | 10.0 | — | 9.0 | 9.1 | — | — | — | — | — | | |
| Xylitol | — | — | 19.5 | 8.5 | 8.2 | 50.0 | — | 10.0 | 9.0 | 9.4 | | |
| Xylitol Solution | — | — | 10.0 | — | — | — | — | — | — | 9.0 | | |
| Softener* | 1.0 | 1.0 | 0.5 | — | 0.9 | 1.0 | 1.0 | 1.0 | 1.0 | 0.2 | 0.2 | |
| Flavor** | 1.5 | 1.5 | 1.0 | 1.0 | 1.2 | 1.0 | 1.0 | 1.2 | 1.2 | 1.2 | 1.2 | 3.2 |
| Synthetic Sweetener*** | 0.1 | 0.1 | 0.1 | 0.1 | 0.1 | 0.1 | 0.1 | 0.1 | 0.1 | 0.1 | | |
| Sugar (Sucrose) | | | | | | | | | | | 62.09 | 61.0 |
| Corn Syrup | | | | | | | | | | | 15.0 | 15.0 |

*Softener - May be of the vegetable oil type, soya derivatives, glyceryl monostearates, lecithin
**Flavor - Typical flavors such as peppermint oil, spearmint oil, mixed fruits, cinnamon, citrus, sours, fruit acids
***Synthetic Sweetener - saccharin, salts of saccharin, dihydrochalcones, glycyrrhizin, asparatame

TABLE II

| Coating Solution | |
| --- | --- |
| Water | 38% |
| Xylitol | 60% |
| Titanium Dioxide (or other colorant) | 1% |
| Gum Arabic (or other binder) | 1% |

The chewing gums obtained have a smooth bright white coating which is substantially free of imperfections.

In control runs, chewing gums are prepared having compositions similar to those of Examples 1 to 12. The xylitol-coating solution contains only 40 to 45% solids or about 50% less xylitol in the final coating as compared to Examples 1 to 12. The xylitol-coated chewing gums produced in the control runs are found to have a coating which is grayish off-white and is less smooth and less uniform then the coatings produced in accordance with the invention. This is believed to be due to the generally longer coating times required in coating with the control xylitol-coating solution having reduced amounts of xylitol.

What is claimed is:

1. A xylitol-coated chewing gum including a gum center comprising gum base, sweetener, and flavor, and a xylitol coating thereon containing from about 95 to about 99.5% xylitol, binder, color, and flavor said coating applied from an aqueous solution containing at least about 55% by weight solids of which at least about 95% by weight is xylitol.

2. The chewing gum as defined in claim 1 wherein said binder is present in the coating in an amount within the range of from about 0.5 to about 1.5% by weight of said coating.

3. The chewing gum as defined in claim 1 wherein said binder is selected from the group consisting of gum arabic, xanthan gum, gum tragacanth, tapioca dextrin and modified food starch.

4. The chewing gum as defined in claim 1 wherein said sweetener is a natural sweetener or artificial sweetener.

5. The chewing gum as defined in claim 1 wherein said binder in said coating is gum arabic.

6. The chewing gum as defined in claim 5 wherein said coating further includes titanium dioxide.

7. The method for preparing a xylitol-coated chewing gum as defined in claim 1 which comprises the steps of forming an aqueous xylitol-coating solution comprising at least 55% solids of which at least about 95% is xylitol, together with binder and colorant, and applying the xylitol-coating solution to pieces of gum centers.

8. The method as defined in claim 7 wherein the xylitol-coating solution is sprayed on the gum centers.

* * * * *

UNITED STATES PATENT AND TRADEMARK OFFICE
CERTIFICATE OF CORRECTION

PATENT NO. : 4,127,677

DATED : November 28, 1978

INVENTOR(S) : Paul R. Fronczkowski et al.

It is certified that error appears in the above—identified patent and that said Letters Patent are hereby corrected as shown below:

In the Abstract, line 2, delete ". The xylitol".
In the Abstract, line 3, delete "coating" and insert a comma.
Table I, Example 7, on line entitled Gum Base, "00.0" should read --30.0--.
Table I, Example 10, on line entitled Softener*, "0.2" should read --1.0--.
Table I, Example 11, on line entitled Sugar(Sucrose), "62.09" should read --62.0--.
Table I, Example 12, on line entitled Softener*, insert --0.2--.

Signed and Sealed this

Twenty-seventh Day of March 1979

[SEAL]

Attest:

RUTH C. MASON
Attesting Officer

DONALD W. BANNER
Commissioner of Patents and Trademarks